March 28, 1939.  R. F. DALTON  2,152,538
CLOSED CAR VENTILATION
Filed Feb. 23, 1938  2 Sheets-Sheet 1
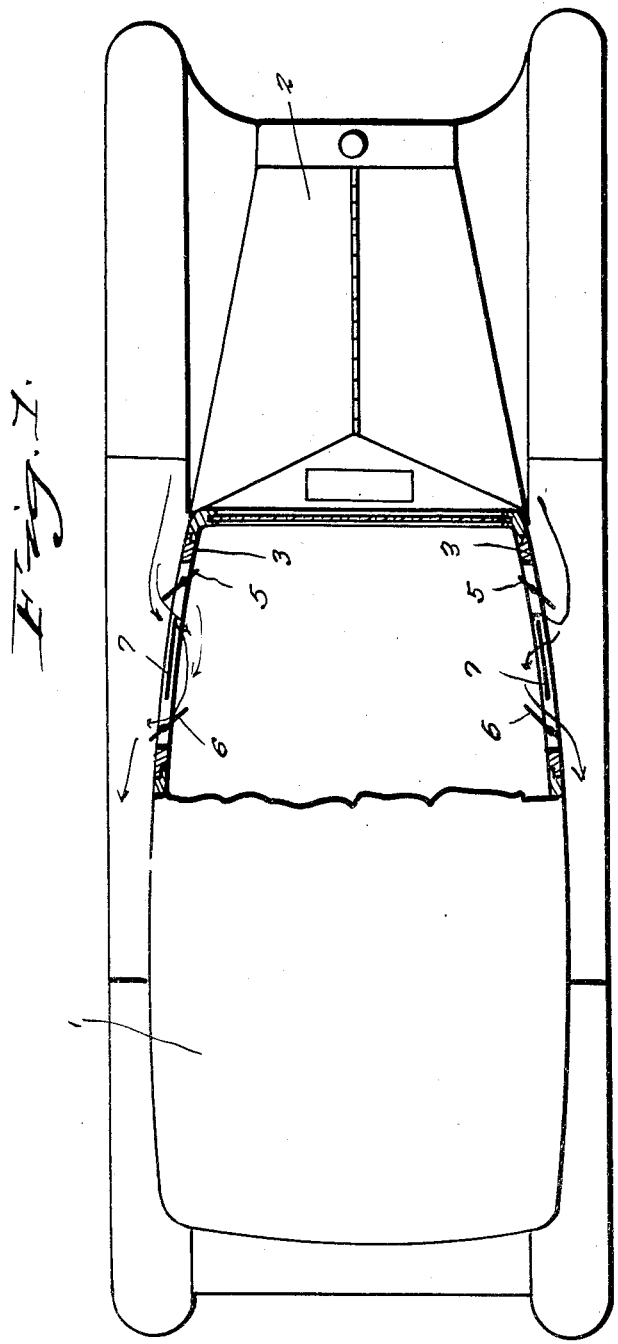
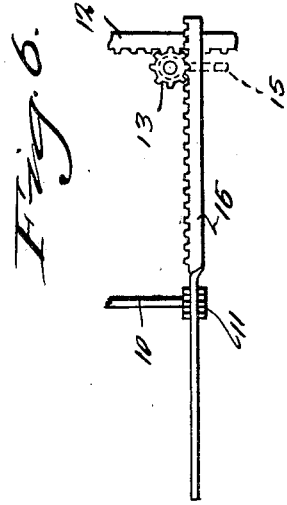
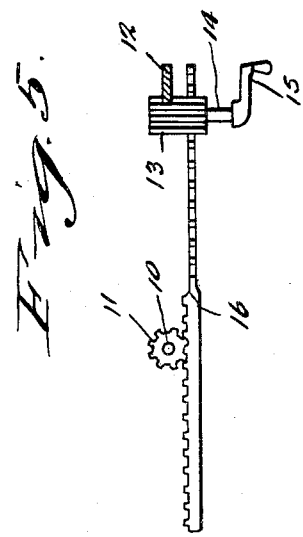
Inventor
Robert F. Dalton
By Clarence A. O'Brien
Hyman Berman
Attorneys

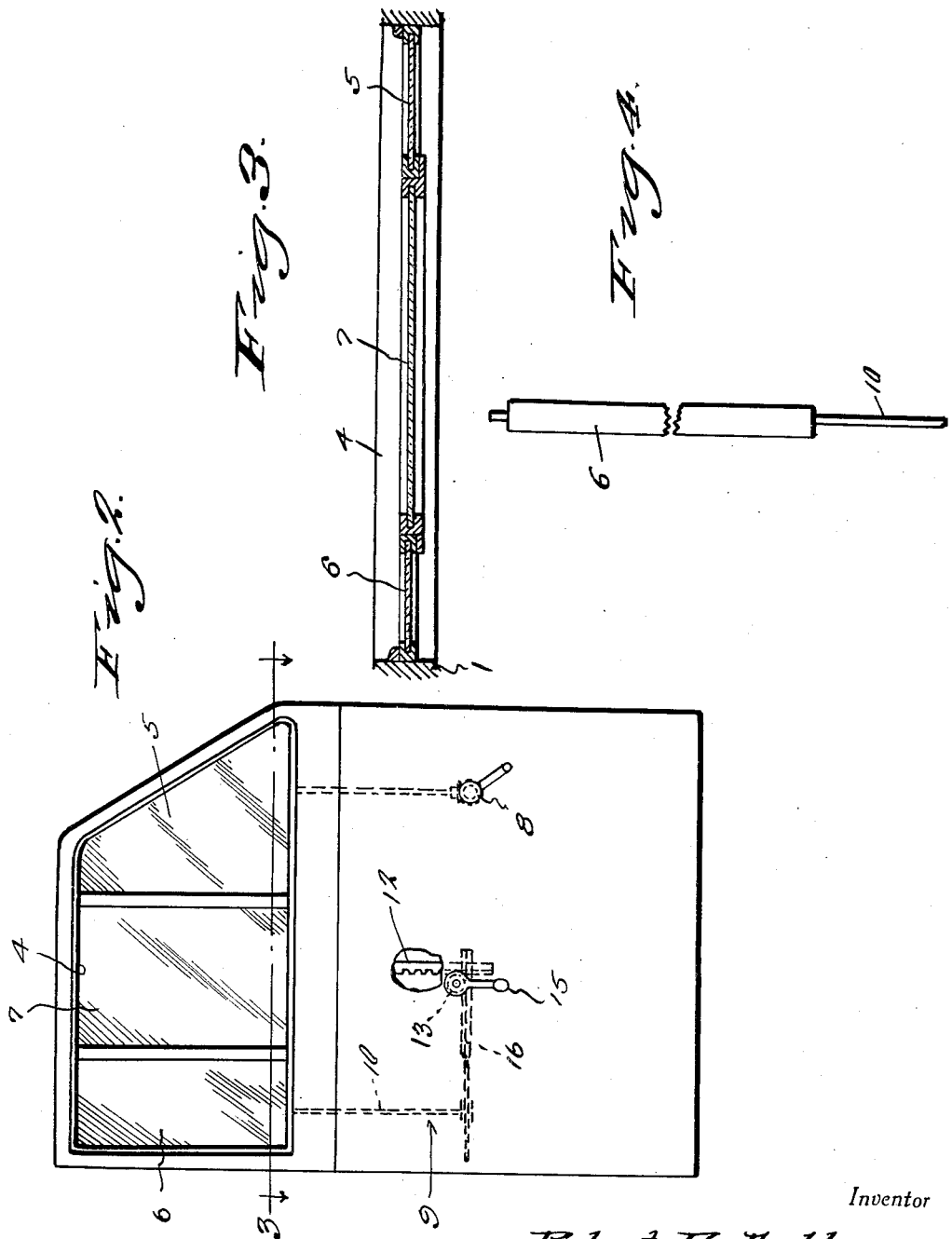

Patented Mar. 28, 1939

2,152,538

UNITED STATES PATENT OFFICE 2,152,538

CLOSED CAR VENTILATION

Robert Francis Dalton, Mansfield, Ohio

Application February 23, 1938, Serial No. 192,137

4 Claims. (Cl. 296—44)

The present invention relates to new and useful improvements in closed car ventilation and has for its primary object to provided, in a manner as hereinafter set forth, a novel construction, combination and arrangement of parts whereby drafts in the vehicle may be substantially eliminated at all times in addition to materially reducing wind roar or whistle.

Another very important object of the invention is to provide, in a ventilating means for closed cars comprising a pair of pivotally mounted panels and a pane slidable therebetween, novel means common to said pane and one of the panels whereby they may be actuated in unison.

Other objects of the invention are to provide a closed car ventilating means of the character described which will be comparatively simple in construction, highly efficient and reliable in use, attractive in appearance and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in top plan of a closed automobile, a portion of the body thereof being broken away in horizontal section in a manner to disclose an embodiment of the present invention.

Figure 2 is an elevational view of an automobile door equipped with the present invention, looking at the inner side thereof.

Figure 3 is a view in horizontal section, taken substantially on the line 3—3 of Fig. 2.

Figure 4 is an elevational view of one of the pivoted panels, looking at an edge thereof.

Figure 5 is a top plan view of the means for operating the sliding pane and the rear panel in unison, one of the elements being shown in horizontal section.

Figure 6 is a view in side elevation of the operating mechanism shown in Fig. 5.

Referring now to the drawings in detail, it will be seen that the reference numeral 1 designates the closed body of an automobile 2. The reference numeral 3 designates a pair of doors with which the body 1 is provided. The doors 3 are provided with the usual window openings 4.

Pivotally mounted for rotation in a horizontal plane in the window opening 4 of each of the doors 3 are spaced front and rear panels 5 and 6, respectively, of glass. Mounted for vertical sliding movement between the panels 5 and 6 is a pane 7.

The panels 5 and 6 may be adjusted to the positions shown to advantage in Fig. 1 of the drawings and, of course, the pane 7 is moved vertically when it is opened or closed. A suitable operating mechanism 8 is provided for adjusting the front panel 5 independently. A mechanism for adjusting the slidable pane 7 and pivoted back panel 6 in unison is designated generally by the reference numeral 9.

The mechanism 9 comprises a rod 10 fixed to the lower end of the panel 6 and depending therefrom in the door. Fixed on the lower end portion of the rod or shaft 10 is a pinion gear 11. Secured to the slidable pane 7 and depending therefrom in the door is a rack bar 12. The reference numeral 13 designates an elongated pinion gear which raises and lowers the rack bar 12. The gear 13 is fixed on a shaft 14 which is provided with an operating crank 15. The reference numeral 16 designates a rack bar which is twisted at an intermediate point in such a manner that the teeth on the halves thereof will operate in planes 90 degrees apart from each other. Thus, one end portion of the rack bar 16 meshes with the gear 11 and the other end portion of said rack bar meshes with the gear 13.

In operation, with the front panels 5 in open position and the panes 7 lowered, the wind, after passing the trailing edges of said panels 5, is drawn inwardly by suction toward the interior of the body 1. However, these streams of air are intercepted by the panels 6 and deflected outwardly again. This is indicated by the arrows in Fig. 1 of the drawings. As the panes 7 are lowered and raised the back panels 6 are opened and closed. In other words, the elements 6 and 7 are adjusted simultaneously through the medium of the mechanism 9 in each door.

It is believed that the many advantages of a closed car ventilating means constructed in accordance with the present invention will be readily understood and although a preferred embodiment is as illustrated and described, it is to be understood that changes in the details of construction and in the combination and arrangement of parts may be resorted to which will fall within the scope of the invention as claimed. For example, the elements 6 and 7 may, if desired, be adjusted independently.

What is claimed is:

1. In a closed vehicle body having a window opening therein, the combination of a pair of spaced panels pivotally mounted in the window opening for swinging adjustment in a horizontal plane in the same direction, and a pane mounted for vertical sliding movement between said panels.

2. In a closed vehicle body having a window opening therein, the combination of a pair of spaced panels pivotally mounted in the window opening for swinging adjustment in a horizontal plane in the same direction, a pane mounted for vertical sliding movement between the panels, manually operable means for adjusting one of the panels, and manually operable means for adjusting the pane and the other of said panels.

3. In a closed vehicle body having a window opening therein, the combination of front and rear panels pivotally mounted in the window opening for swinging adjustment in a horizontal plane in the same direction, a pane slidably mounted between the front and rear panels for adjustment in a vertical plane, means for adjusting the front panel, and common means for adjusting the slidable pane and the rear panel simultaneously.

4. In a closed vehicle body having a window opening therein, the combination of a pair of spaced panels pivotally mounted in the window opening for swinging adjustment in a horizontal plane in the same direction, a pane slidably mounted between the panels for adjustment in a vertical plane, means for manually adjusting one of the panels, and common means for adjusting the other of said panels and the pane, the last named means including a shaft fixed to the lower end of said other panel and depending therefrom, a gear fixed on said shaft, a rack bar depending from the pane, a gear operatively engaged with the rack bar, a second rack bar operatively connecting the first named gear to the second named gear for actuation thereby, and an operating crank connected to the second named gear.

ROBERT FRANCIS DALTON.